Feb. 10, 1942.    W. H. VOGT    2,272,256
RATIO CONTROLLER
Filed May 27, 1941    5 Sheets-Sheet 3

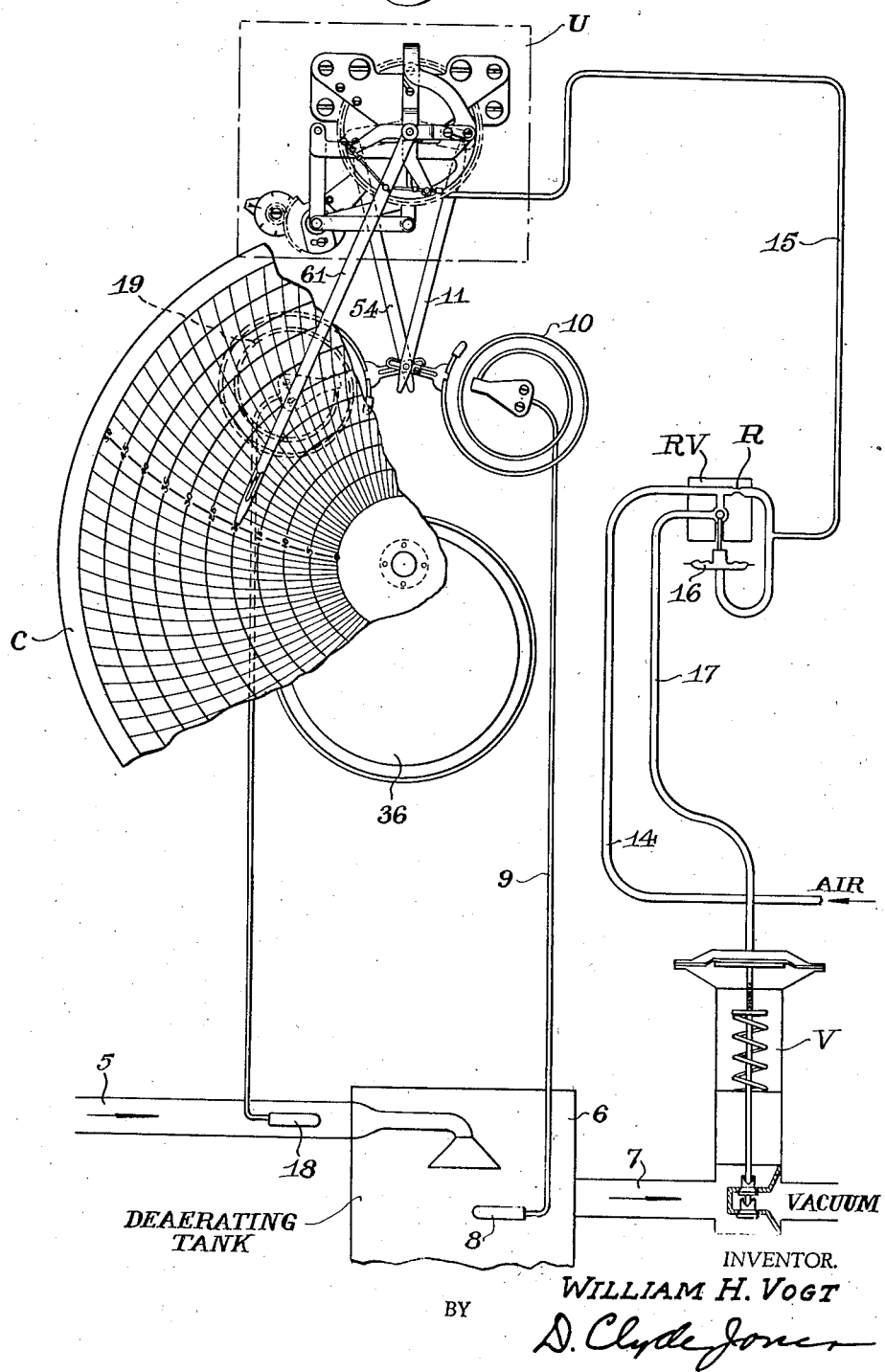

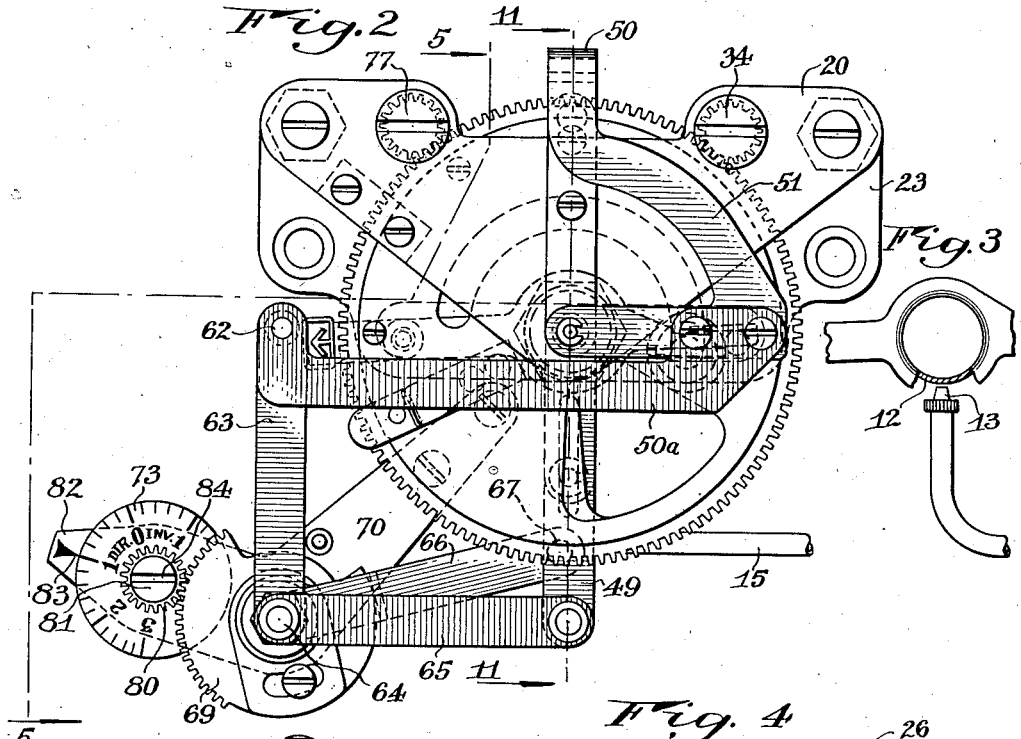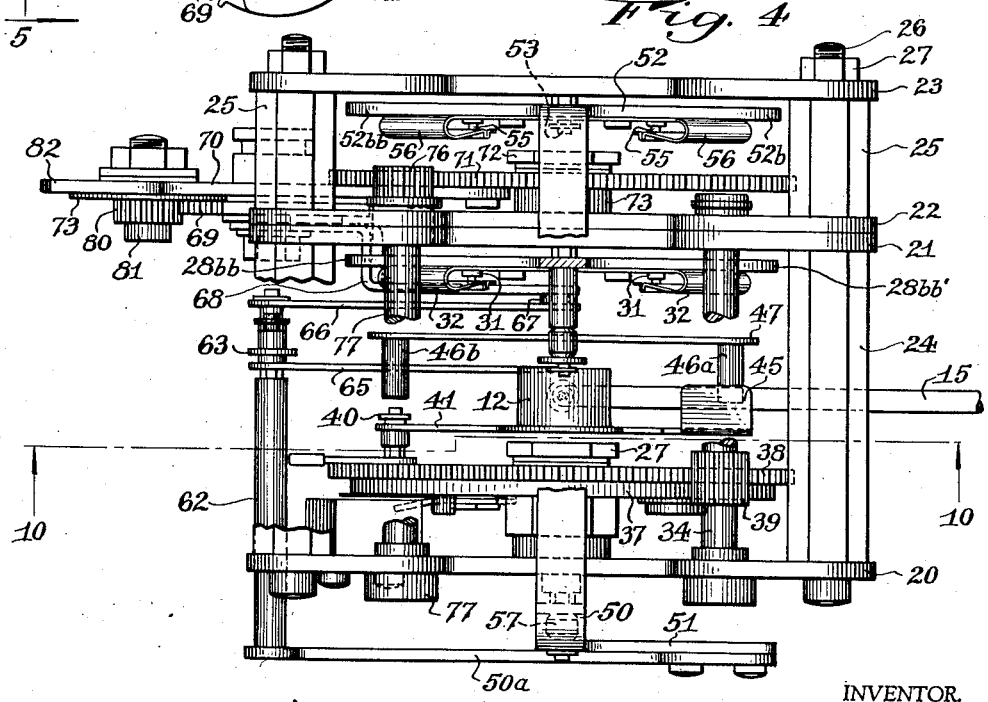

INVENTOR.
WILLIAM H. VOGT
BY D. Clyde Jones

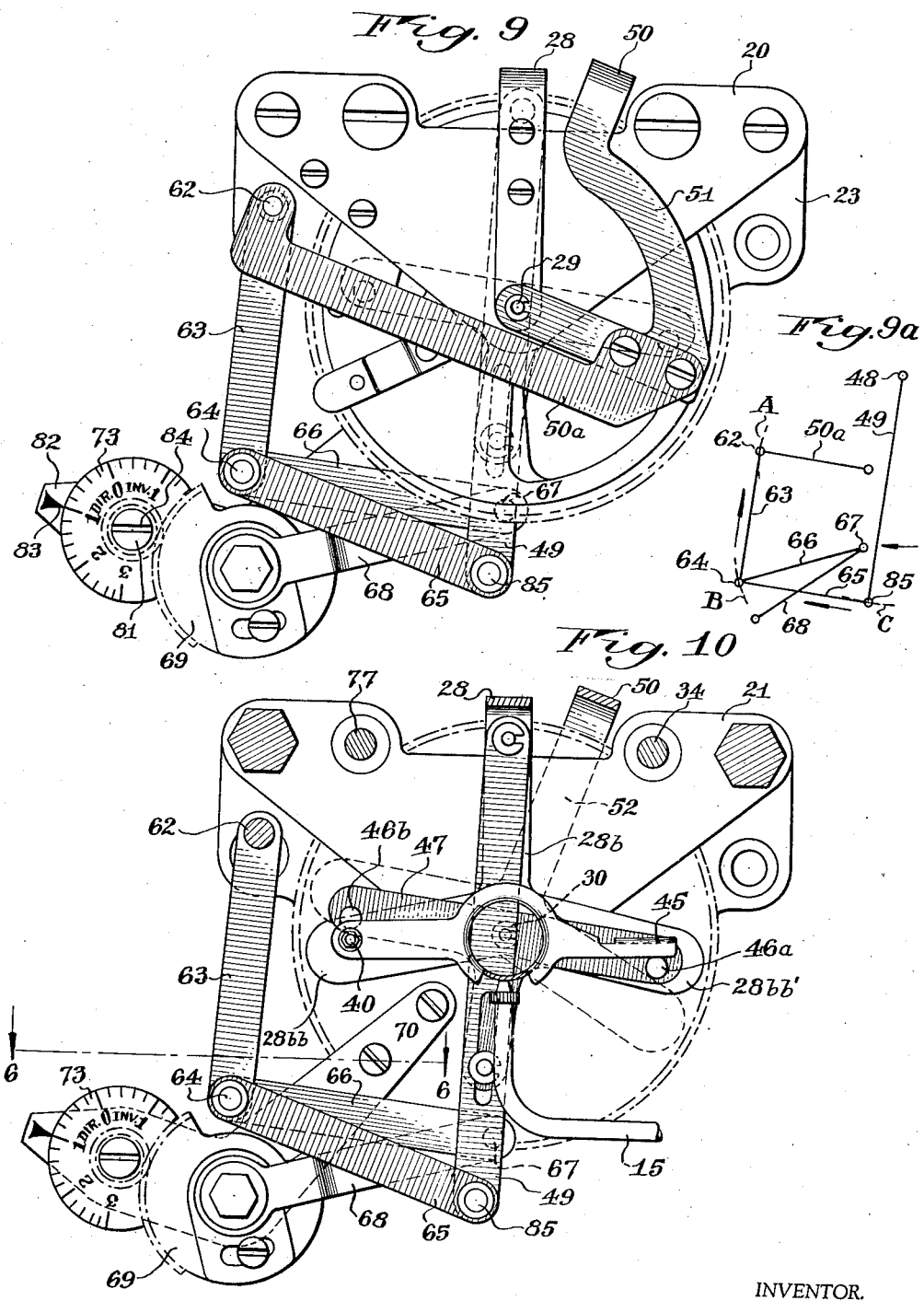

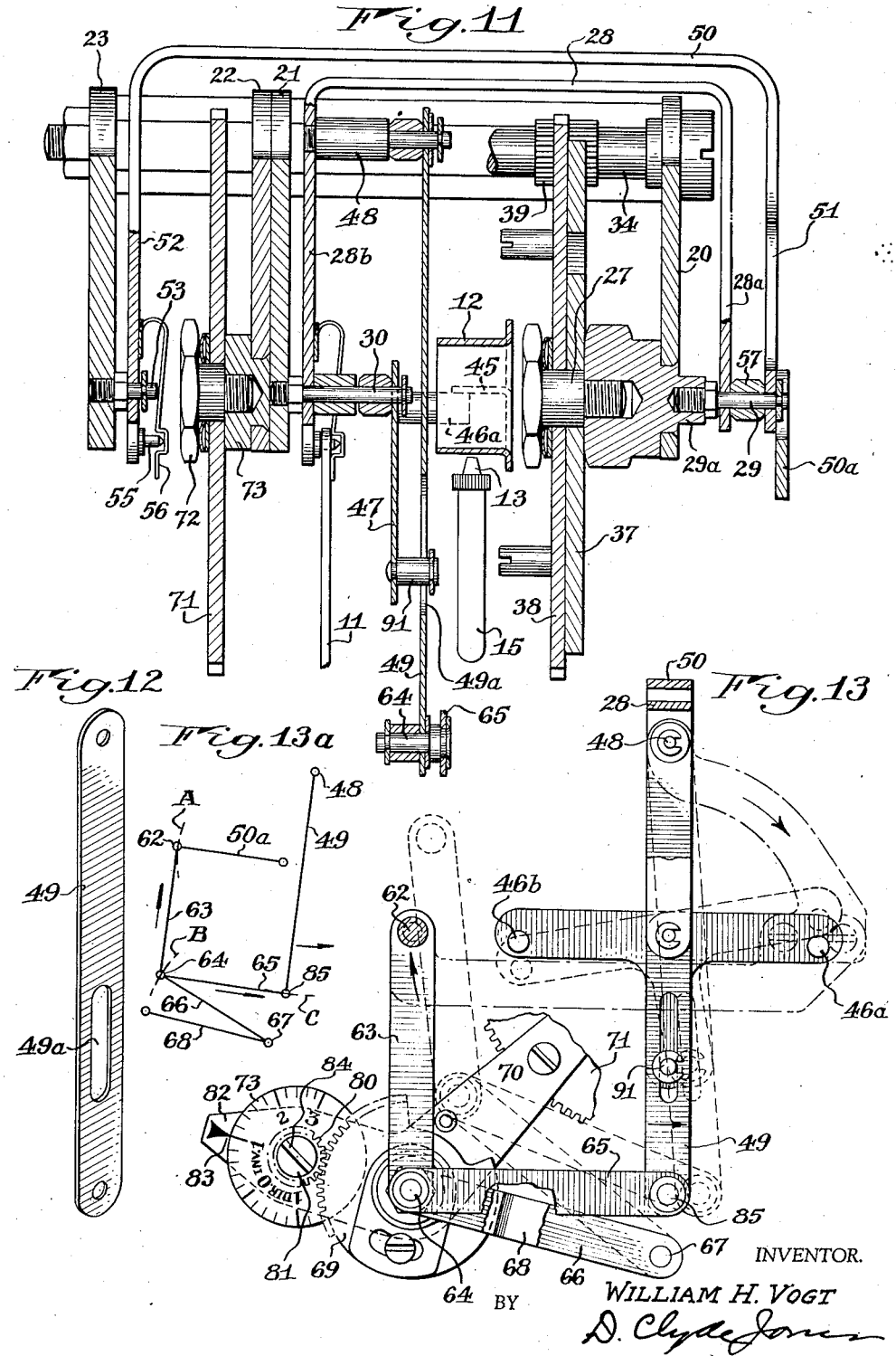

Patented Feb. 10, 1942

2,272,256

UNITED STATES PATENT OFFICE 2,272,256

RATIO CONTROLLER

William H. Vogt, Rochester, N. Y., assignor to Taylor Instrument Companies, Rochester, N. Y., a corporation of New York Application May 27, 1941, Serial No. 395,427

7 Claims. (Cl. 74—1)

This invention relates to controllers and more particularly to ratio controllers.

In many control installations it is desirable to control one variable in a given ratio with respect to a related variable. For example, in a deaerating system it may be desirable to control the rate of deaeration by maintaining a given ratio between the temperature of the liquid introduced into the deaerater and the temperature of the deaerated liquid.

Likewise, in the control of room heating it is frequently desirable to maintain the room temperature at a higher value when the weather is cold than when it is warm. In this instance, the outside temperature serves to adjust the set point of the controller which governs the inside temperature. However, in this arrangement the controlling system will be of the inverse ratio type, that is, when the outside temperature drops the control point for the inside temperature will be raised and vice versa.

Similar requirements for ratio controllers are encountered in maintaining pressures, liquid level or flow of a controlled medium according to a predetermined ratio.

The present invention has for its purpose a ratio controller which is relatively simple in construction, which is readily adjusted, and which can be changed from direct to inverse ratio operation merely by the rotation of a part, in other words, without disassembling any part of the equipment.

Figure 5:
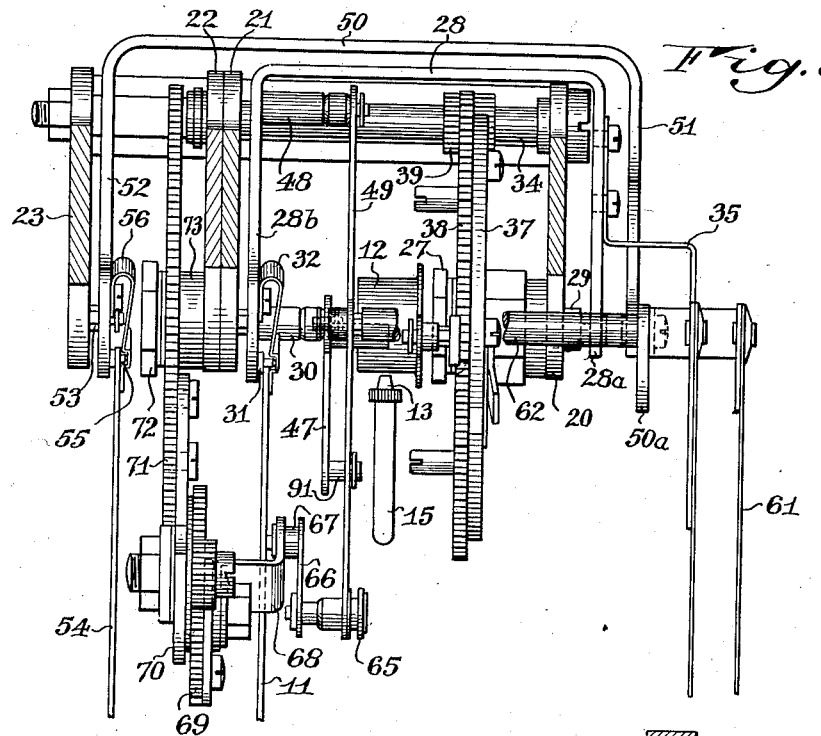
Figure 6:
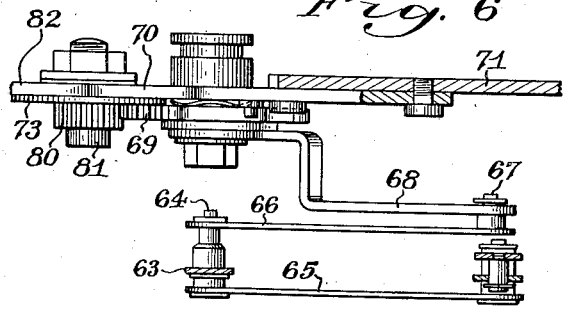
Figure 7:
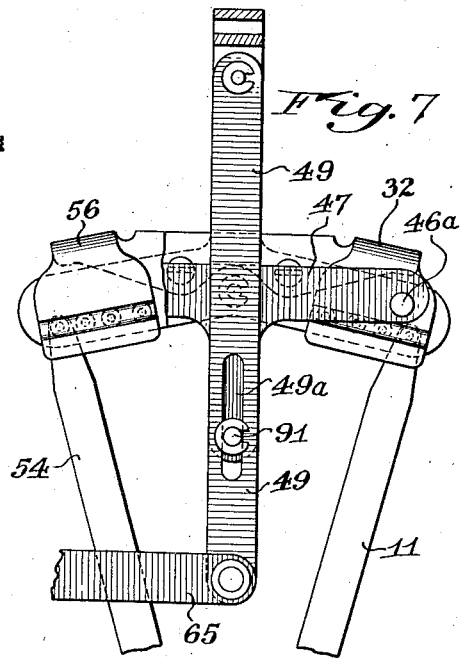

The various features and advantages of the invention will appear from the detailed description and claims when taken with the drawings in which Fig. 1 is a diagrammatic showing of the ratio controller of the present invention installed in a deaerating system, the instrument unit proper being represented within the broken line rectangle U; Fig. 2 is a front view of the instrument mechanism illustrated within the rectangle U; Fig. 3 is a fragmentary front view of the baffle and nozzle controlling couple thereof; Fig. 4 is a top view of the unit as illustrated in Fig. 1 with certain portions broken away for clearness in disclosure; Fig. 5 is a vertical section taken substantially on the line 5—5 of Fig. 2; Fig. 6 is a sectional view taken on the line 6—6 of Fig. 10; Fig. 7 is a detail view showing the relation between the differential lever and the T-shaped lever; Fig. 9 is a front view of the unit similar to Fig. 2 and Fig. 10 is vertical section taken on the line 10—10 of Fig. 4 and Figs. 9 and 10, showing the relation of certain of the instrument parts when the baffle approaches the nozzle where the instrument is adjusted for direct ratio operation; Fig. 9a is a line diagram of the linkage of Fig. 9; Fig. 11 is a vertical section taken on the line 11—11 of Fig. 2; Fig. 12 is a perspective view of the differential lever; Fig. 13 is a fragmentary view illustrating a portion of the controller when it is adjusted for inverse ratio operation; and Fig. 13a is a line diagram of the linkage of Fig. 13.

In Fig. 1 the invention is diagrammatically illustrated as incorporated in a temperature controlling system, such as a deaerating system. In such a deaerating system the liquid to be aerated flows through a pipe 5 into the top portion of the deaerating tank 6 where it is discharged as a spray. The top portion of the deaerating tank 6 is partially evacuated thru the pipe 7 which is connected to a vacuum pump (not shown). In the installation of the invention as shown, the controlling, thermosensitive tube system including the bulb 8, the capillary 9 and the Bourdon spring 10 together with other mechanism, maintains the temperature within the deaerating tank at a given set point, to control the degree of vacuum therein and, therefore, the rate of deaeration, the bulb being placed in a position to be affected by a film or sheet of the liquid after it has been deaerated. The Bourdon spring 10 through the link 11 varies the spaced relation between a baffle 12 and a nozzle 13 (Fig. 3) of the controller mechanism within the dotted rectangle U of Fig. 1, compressed air being supplied through conduit 14, restriction R and nozzle pipe 15 to the nozzle. When in the course of the operation of the controller, the baffle 12 approaches the nozzle 13, the pressure in the nozzle pipe will increase, causing the capsular chamber 16 of a relay valve RV to expand. This operation of the capsular chamber closes the ball of the relay valve and restricts the application of compressed air through pipe 17 to the diaphragm top of the motor valve V. This tends to open the valve V to increase the degree of vacuum in the deaerating tank.

In accordance with the present invention, an adjusting thermosensitive tube system including the bulb 18 communicating thru a capillary tube with Bourdon spring 19, actuates adjusting mechanism, within rectangle U, to be described. This mechanism automatically adjusts the control or set point of the controlling system to maintain a given ratio between the temperatures at the bulbs 8 and 18. The bulb 18 of the adjusting tube system is introduced into the stream of untreated liquid flowing through the pipe 5 so that a change in temperature of this liquid is effective to change automatically the control point of the controller. In this way the controller will have its set-point automatically adjusted in a given ratio to another variable, in this instance the temperature of the untreated liquid at the bulb 18.

The actuating mechanism of the controller as illustrated in Figs. 2 to 13a, includes a unit U adapted to be mounted on the inner rear wall of an instrument case (not shown). This unit includes a frame comprising triangular plates 20, 21, 22 and 23, with the plates 21 and 22 secured in face-to-face contact and with the plates 20 and 23 secured in spaced relation with respect thereto by means including suitable pedestals 24 and 25. A U-shaped pen arm yoke 28 of a controlling system has its arm 28a rotatably mounted on a pivot pin 29 projecting from the front of the plate 20, while the arm 28b of this yoke is mounted on the pivot pin 30 projecting from the front of the plate 21, the arbors 29 and 30 preferably being arranged coaxially (Figs. 4 and 5). As best illustrated in Fig. 11, the arbor 29 is screwed into that end of a hub 29a which is staked into an opening in the plate 20 while arbor 30 is screwed directly into the plate 21. The arm 28b as best illustrated in Fig. 4, is made with extensions 28bb and 28bb' radiating from the arbor 30. These extensions are provided with pins 31 and retaining clips 32 to receive the upper end of the previously mentioned connecting link 11. It will be understood that the connecting link 11 will be detachably connected either to the extension 28bb or 28bb', depending on the type of operation that is desired, that is, direct or reverse operation. The lower end of the link 11 is pivotally connected to the free end of the Bourdon spring 10 forming a part of the controlling tube system previously referred to.

The arm 28a of the pen arm bracket has secured thereto a pen arm 35, the free end of which terminates in a stylus adapted to mark on a chart C. This chart is rotated in accordance with the passage of time by a suitable clock 36.

Figure 8:
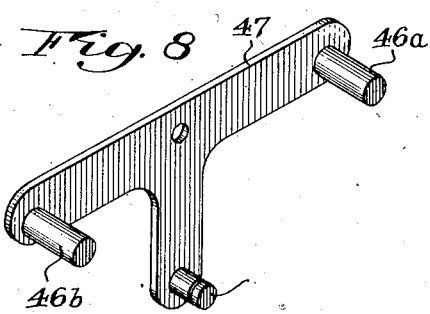

From the hub 29a, mounted on the rear surface of the plate 20, there projects the pivot screw 27 on which there is rotatably mounted in face-to-face relation, a disc 37 and a gear 38. The disc 37 and the gear 38 are normally latched together to rotate as a unit in order to change the set point of the controlling system, but can be unlatched from each other to change the controlling system from direct to reverse operation and vice versa as is fully disclosed in the copending application of Tate, Vogt and Clarridge, Serial No. 349,024, filed July 31, 1940. The gear 38 is rotated by means of a pinion 39 formed on a stub shaft 34 which is rotatably mounted in the plates 20, 21 and 22. The front end of this stub shaft is slotted so that it can be engaged by a screw driver to rotate the shaft and through its pinion 39, effect rotation of the gear 38. On the rear surface of the gear 38 there is pivotally mounted at 40, a baffle arm 41. This baffle arm carries a cylindrical baffle 42 adapted to cooperate with the nozzle 13 mounted on the free end of nozzle pipe 15. It will be understood that the baffle arm is pivotally mounted eccentrically of the axis of the gear 38 so that the cylindrical baffle 42 can swing in an arc which intersects the mentioned axis. The free end of the arm 41 is provided with a flange 45, which in the adjustment of the instrument as shown in Fig. 4, is adapted to be engaged by a pin 46a projecting from the front of a T-shaped lever 47 (Fig. 8). The lever 47 as illustrated in Fig. 11 is pivoted at an intermediate point thereof on the arbor 30. The left end of the arm 47 is likewise provided with a forwardly projecting pin 46b which is adapted to cooperate with the flange 45 on the baffle arm 41 when the instrument is adjusted for reverse operation.

The arm 28b of the pen arm yoke 28 is provided with a forwardly projecting pin 48 on which the upper end of a differential lever 49 is pivotally mounted. The lever 49 (Figs. 5, 7 and 12) has a slot 49a therein to receive a pin 91 carried on the vertical extension of the T-shaped lever 47.

Let it be assumed that the lower end of the differential lever 49 is held stationary, which is the situation that prevails when the condition at bulb 18 of the adjusting system remains unchanged, then on a temperature change at the bulb 8 of the controlling system, the following control action will be effected. For example, on a temperature rise, the Bourdon spring 10 will unwind. This will pull the link 11 downward, and since it is connected to the extension 28bb' of the pen arm yoke 28, it will rock this yoke in a clockwise direction. In the course of the movement of this pen arm yoke, the pin 48 carried thereby, will swing the upper end of the differential lever 49 in a clockwise direction. As this lever swings, the pin 91 carried on the T-shaped lever 47 will move upward in the slot 49a of the differential lever 49. This will rock the T-shaped lever counterclockwise so that the pin 46a, projecting from the front thereof, will lift the flange 45 of the baffle lever 41. The upward movement of the baffle lever raises the baffle 12 away from the nozzle 13. The pressure in the nozzle pipe 15 will drop and the capsular diaphragm 16 (Fig. 1) will tend to contract. This will permit compressed air to be applied through the pilot relay valve RV to the top of the motor diaphragm valve V. This motor diaphragm valve will open to allow a greater amount of controlling medium to pass. The reverse of these operations will take place on a drop in temperature at bulb 8.

The portion of the unit just described, functions as an ordinary controller. In accordance with the present invention, the unit is provided with mechanism which automatically adjusts the set point thereof in a predetermined ratio with respect to a second variable. This mechanism includes a second or adjusting pen arm yoke 50 of U-shaped construction. The arms 51 and 52 of this yoke are respectively mounted on the arbors 29 and 53, these arbors being coaxially arranged with respect to the pivotal support of the pen arm yoke 28. The arm 51 of yoke 50 is spaced from arm 28a of yoke 28 by means of sleeve 57. The arm 52 of the yoke is provided with extensions 52b and 52bb, to either of which the upper end of the link 54 may be pivotally attached by means of any one of the pins 55 and the spring retaining clips 56. The lower end of the link 54 is pivotally connected to the free end of the Bourdon spring 19 of the adjusting tube system.

The arm 51 of the pen arm yoke 50 has secured thereto a pen arm 61, the free end of which terminates in a stylus to mark on the chart C. As illustrated in Fig. 1, the pen arm 61 is superimposed over the pen arm 35 but it will be understood that these pen arms have independent movement in accordance with the responses of their respective tube systems. The extension 50a secured to the yoke arm 50 has fixed on the free end thereof, a rearwardly extending rod 62, best shown in Fig. 4. The free end of the rod 62 has pivotally mounted thereon one end of a link 63 (Figs. 2, 9, 10 and 13). The other end of the link 63 is pivoted on a pin 64 carried on one end of a second link 65. Link 65 at its other end carries a pin 85 on which the lower end of the differential lever 49 is pivoted. The pivot pin 64 has pivotally mounted thereon one end of a third link 66, the remaining end of which is pivoted at 67 to one end of link 68. It should be noted that as herein shown, links 65 and 66 as well as arm 68 are of equal effective lengths. The other end of arm 68 is secured to a segment gear 69 which is rotatably mounted on an angularly adjustable bracket 70 near the free end thereof. The remaining end of the bracket 70 is secured to a gear 71. This gear is rotatably mounted on a pivot screw 72 (Fig. 11) which is screwed into a hub 73 staked in an opening in the supporting plate 22. This pivot screw 72 is also coaxially mounted with the arbors 29, 30 and 53. The gear 71 is rotated by a pinion 76 formed on the shaft 77 which is rotatably supported in the plates 20, 21 and 22 (Fig. 4). The front end of the shaft 77 (Fig. 2) is provided with a kerf to receive an adjusting screw driver. When this shaft is rotated, it rotates the pinion 76 which in turn rotates the gear 71. Gear 71 on rotation changes the angular position of the bracket 70 thereby "squaring" the linkage. This "squaring" of the linkage, that is, bring the links 63 and 64 into generally right angular relation in the midportion of the expected operating range of the linkage for a given installation, affords a more nearly linear and therefore a more accurate ratio control relation.

In accordance with the present invention, the device can be changed from direct ratio operation as shown in Figs. 9 and 10 to inverse ratio operation as shown in Fig. 13 merely by a simple rotary adjustment. This adjustment mechanism comprises a pinion 80 (Figs. 2, 4 and 6) fixed to a pivot screw 81 rotatably supported on an extension 82 of bracket 70 in a position to mesh with the segment gear 69.

The pinion 80 carries a graduated disc 73 with respect to a reference mark 83 marked on the extension 82. The pivot screw 81 has a kerf 84 therein to receive a screw driver by which the pinion carried thereby and meshing with the segment gear, can be adjusted from "Dir" (direct ratio) "3—2—1—0" through "0—1—2—3" "Inv" (inverse ratio). The adjustment of the segment gear in this manner rotates the arm 68 to change the position of the pivot 67.

The term ratio as herein employed refers to the relation between the movement of the controlling pen arm 35 to the movement of adjusting pen arm 61.

In describing the operation of the controlling portion of the instrument, it was assumed that the adjusting portion of the instrument was stationary and consequently the pivot 85 constituting the mounting for the lower end of the differential lever 49, was stationary. In describing the operation of the automatic adjusting portion of the instrument, it will be assumed that the controlling system is temporarily stationary, with the result that the pivot 48 for the upper end of the differential lever 49 will be stationary. Under this condition with the controlling system set for direct ratio control, the operation will be as follows:

Let it be assumed that there is a temperature increase at the bulb 18 of the adjusting system. This will swing the arm 50a in a clockwise direction and will move the pin 62 upward in a path represented by the dotted arc A (Fig. 9a). The link 63 will be moved upward and the pivot 64 at the lower end of this link will travel upward in the arc B, the movement of this pivot in this arc being controlled by the link 66 which swings about the pivot 67 as a center. As the pivot 64 moves upward in the arc B, it will draw the link 65 toward the left with the result that the pivot 85 at the lower end of the differential lever will swing in an arc C. It will be noted that this arc C has its center at the point 48 (now assumed to be stationary) and that in this instance, the differential lever moves clockwise. This results in the baffle 12 approaching the nozzle 13 to effect the controlling operation, as previously described.

A drop in temperature effects a similar operation but in the reverse sense, of the parts just described, that is, on a drop in temperature at bulb 18 the differential lever 49 will move counterclockwise to raise the baffle from the nozzle.

It should be pointed out that, when the pivot pin 67 is adjusted as far as possible from the pivot pin 85, the largest ratio effect is obtained, but as the pivot pin 67 approaches the pivot pin 85 this ratio is reduced until it becomes zero, when the pivot pins 67 and 85 are in coaxial relation. When these pivot pins are thus coaxially arranged, any change in temperature at the adjusting bulb 18, although it operates the arms 50a and 60c, will cause no movement of the lower end of the differential lever 49 and consequently there will be no adjusting effect on the control portion of the instrument.

In the event that the instrument is adjusted for inverse ratio operation, as shown in Figs. 13 and 13a, the operation of the adjusting portion of the instrument will be as follows under the conditions assumed above, that is, when the controlling system maintains the pivot point 48 stationary. Under this condition, if there is a temperature increase at the bulb 18, the arm 50a will swing upward, moving the pivot pin 62 upward in the arc A as before. This will lift the link 63 but it will now tend to swing the pivot pin 64 toward the right in arc B and link 65 will be moved toward the right tending to swing the pivot pin 85 in the direction of the arrow along the arc C. Thus the differential lever will now swing counterclockwise and will raise the baffle away from the nozzle. A drop in temperature at the bulb 18 will effect similar operation of the mentioned parts, but in the reverse sense from that just described.

When the baffle 12 approaches the nozzle 13 under conditions just described, the pressure in nozzle pipe 15 and the chamber 16 builds up. Chamber 16 therefore expands, tending to close relay valve RV, which tends to cut off the compressed air from the diaphragm motor of valve V. Valve V opens accordingly to increase the degree of vacuum in the deaerating chamber 6. With the increased vacuum in this chamber, the rate of evaporation therein will be increased causing a drop in temperature at bulb 8. The thermosensitive tube system including the bulb 8 and the Bourdon spring 10 operate thru the link 11 and yoke 28 to move in a counterclockwise direction, the pivot pin 48 and also the upper end of the differential lever 49. This differential lever 49 operates the T-shaped 47 to move the baffle away from the nozzle to control the relay valve RV to throttle the compressed air applied to the diaphragm top of motor valve V.

What I claim is:

1. In a control apparatus, a control member movable to different positions in accordance with a resultant effect caused jointly by variations in two different conditions, mechanism including a lever for operating said member, means responsive to variations in one of said conditions for effecting a movement of said lever, mechanism including an adjustable ratio linkage operated in response to variations in the second condition for moving said lever, said adjustable ratio linkage including a first link having one end mounted to swing on a fixed pivot in response to said last-mentioned variations, a second link having one end pivotally connected to said lever, a third link pivotally connecting the remaining ends of said first and second links, said links together with a portion of said lever generally approximating the form of a quadrilateral, a fourth link having one end pivotally connected to the pivotal connection between said second and third links, and a normally fixed pivot adjustable to any one of a plurality of positions located in the arc of a circle intersecting the locus of the pivotal connection of said lever with said second link, the remaining end of said fourth link being rotatable on said fixed pivot.

2. In a control apparatus, a control member movable to different positions in accordance with a resultant effect caused jointly by variations in two different conditions, mechanism including a differential lever for operating said member, means responsive to variations in one of said conditions for effecting a movement of one end of said differential lever, mechanism including an adjustable ratio linkage operated in response to variations in the second condition for moving the remaining end of said differential lever, said adjustable ratio linkage including a first link having one end mounted to swing on a fixed pivot in response to said last-mentioned variations, a second link having one end pivotally connected to the remaining end of said differential lever, a third link pivotally connecting the remaining ends of said first and second links, a fourth link having one end pivotally connected to the pivotal connection between said second and third links, and a normally fixed pivot adjustable to any one of a plurality of positions located in the arc of a circle intersecting the locus of the remaining end of said differential lever, the remaining end of said fourth link being rotatable on said fixed pivot.

3. In a control apparatus, a control member movable to different positions in accordance with a resultant effect caused jointly by variations in two different conditions, mechanism including a differential lever for operating said member, means responsive to variations in one of said conditions for effecting a movement of one end of said differential lever, mechanism including an adjustable ratio linkage operated in response to variations in the second condition for moving the other end of said differential lever, said adjustable ratio linkage including a first link having one end mounted to swing on a fixed pivot in response to said last-mentioned variations, a second link having one end pivotally connected to said differential lever, a third link pivotally connecting the remaining ends of said first and second links, a fourth link having one end pivotally connected to the pivotal connection between said second and third links, and a normally fixed pivot adjustable to any one of a plurality of positions located in the arc of a circle, the remaining end of said fourth link being rotatable on said fixed pivot, said second link and said fourth link having the same effective lengths.

4. In a control apparatus, a control member movable to different positions in accordance with a resultant effect caused jointly by variations in two different conditions, mechanism including a differential lever for operating said member, means responsive to variations in one of said conditions for effecting a movement of one end of said differential lever, mechanism including an adjustable ratio linkage operated in response to variations in the second condition for moving the other end of said differential lever, said adjustable ratio linkage including a first link having one end mounted to swing on a fixed pivot in response to said last-mentioned variations, a second link having one end pivotally connected to said differential lever, a third link pivotally connecting the remaining ends of said first and second links, a fourth link having one end pivotally connected to the pivotal connection between said second and third links, and a normally fixed pivot adjustable to any one of a plurality of positions located in the arc of a circle, the remaining end of said fourth link being rotatable on said fixed pivot, all of said links having the same effective lengths.

5. In a control apparatus, a control member movable to different positions in accordance with a resultant effect caused jointly by variations in two different conditions, mechanism including a differential lever for operating said member, means responsive to variations in one of said conditions for effecting a movement of one end of said differential lever, mechanism including an adjustable ratio linkage operated in response to variations in the second condition for moving the remaining end of said differential lever, said adjustable ratio linkage including a first link having one end mounted to swing on a fixed pivot in response to said last-mentioned variations, a second link having one end pivotally connected to said remaining end of said differential lever, a third link pivotally connecting the remaining ends of said first and second links, said links together with a portion of said lever generally approximating the form of a quadrilateral, a fourth link having one end pivotally connected to the pivotal connection between said second and third links, and a normally fixed pivot adjustable to any one of a plurality of positions located in the arc of a circle intersecting the locus of the remaining end of said differential lever, said arc extending from a point in registry with a point with the area of said quadrilateral to a point out of registry with any part of said area, the remaining end of said fourth link being rotatable on said fixed pivot.

6. In a control apparatus, a control member movable to different positions in accordance with a resultant effect caused jointly by variations in two different conditions, mechanism including a differential lever for operating said member, means responsive to variations in one of said conditions for effecting a movement of one end of said differential lever, mechanism including an adjustable ratio linkage operated in response to variations in the second condition for moving the remaining end of said differential lever, said adjustable ratio linkage including a first link having one end mounted to swing on a fixed pivot in response to said last-mentioned variations, a second link having one end pivotally connected to said differential lever, a third link pivotally connecting the remaining ends of said first and second links, a fourth link having one end pivotally connected to the pivotal connection between said second and third links, a fifth link having one end pivotally connected to the remaining end of said fourth link, and a fixed pin upon which the other end of said fifth lever is pivoted, said second, fourth and fifth links having the same effective lengths.

7. In a control apparatus, a control member movable to different positions in accordance with a resultant effect caused jointly by variations in two different conditions, mechanism including a differential lever for operating said member, means responsive to variations in one of said conditions for effecting a movement of one end of said differential lever, mechanism including an adjustable ratio linkage operated in response to variations in the second condition for moving the remaining end of said differential lever, said adjustable ratio linkage including a first link having one end mounted to swing on a fixed pivot in response to said last-mentioned variations, a second link having one end pivotally connected to the remaining end of said differential lever, a third link pivotally connecting the remaining ends of said first and second links, said links together with a portion of said lever generally approximating the form of a quadrilateral, a fourth link having one end pivotally connected to the pivotal connection between said second and third links, a fifth link having one end pivotally connected to the remaining end of said fourth link, and a fixed pin upon which the other end of said fifth lever is pivoted, the first-mentioned end of said fourth link being movable in an arc intersecting the locus of said fixed pin and the remaining end of said fourth link being movable in an arc intersecting the locus of the remaining end of said differential lever.

WILLIAM H. VOGT.